March 14, 1950     P. R. TRUMPLER     2,500,501
METHOD OF MAKING HEAT EXCHANGERS
Filed Sept. 12, 1946     2 Sheets-Sheet 1
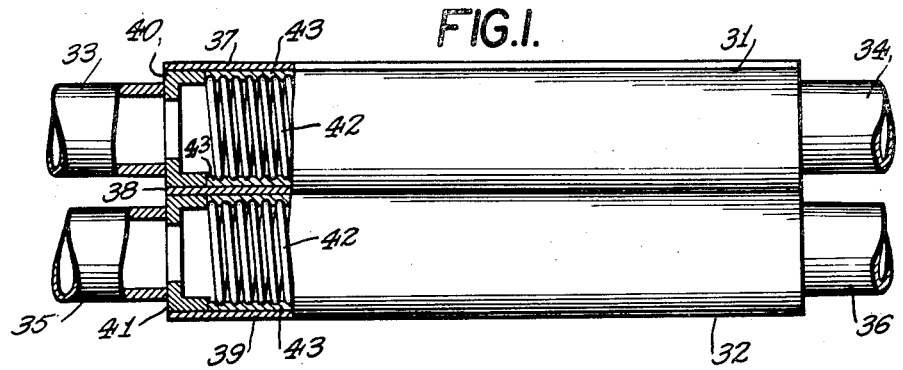
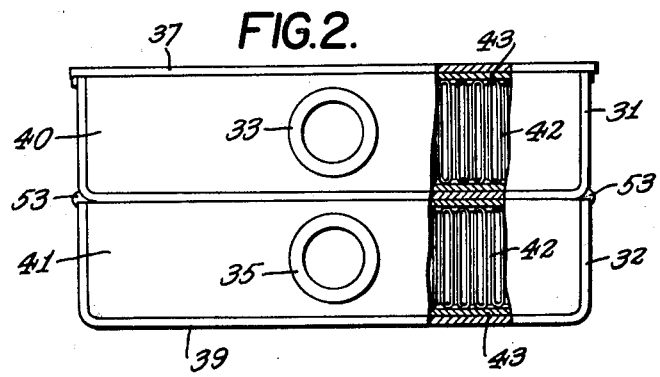
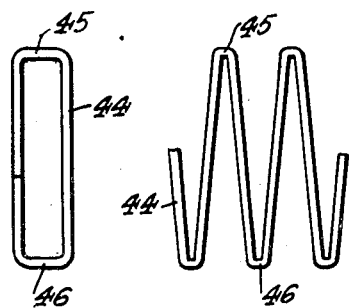 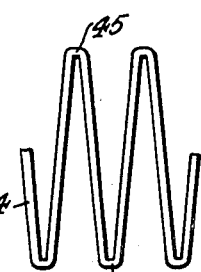 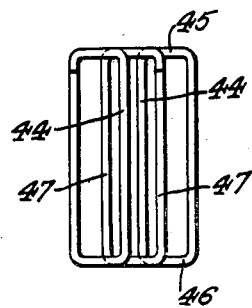 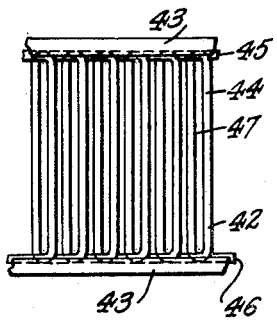
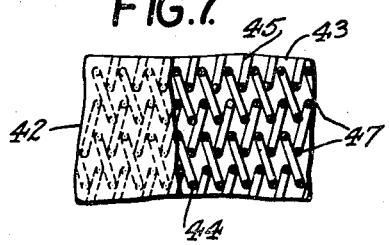
INVENTOR.
PAUL R. TRUMPLER
BY E. J. Liebrecht
William Klabunde
ATTORNEYS March 14, 1950 — P. R. TRUMPLER — 2,500,501

METHOD OF MAKING HEAT EXCHANGERS

Filed Sept. 12, 1946 — 2 Sheets-Sheet 2

INVENTOR.
PAUL R. TRUMPLER
BY E. J. Liebrecht
   William Klabunde
ATTORNEYS

Patented Mar. 14, 1950

2,500,501

UNITED STATES PATENT OFFICE 2,500,501

METHOD OF MAKING HEAT EXCHANGERS

Paul R. Trumpler, Ridgewood, N. J., assignor to The M. W. Kellogg Company, Jersey City, N. J., a corporation of Delaware Application September 12, 1946, Serial No. 696,511

4 Claims. (Cl. 29—157.3)

This invention relates to a method of making extended surface heat exchangers having secondary heat conducting members enclosed within a fluid chamber thereof in thermal connection with the chamber wall.

More particularly, the invention relates to a method of making external surface heat exchangers in which one or more inner fluid chamber walls is mechanically and thermally connected to a plurality of fin-like or pin-like members forming secondary heat conducting elements.

A principal object of my invention is to provide an improved method of making an extended surface heat exchanger.

Another object is to provide an improved method of constructing the secondary extended surface portion of a heat exchanger.

A further object is to provide a novel and improved method of constructing the various parts of my heat exchanger and of assembling the parts to form the complete extended surface heat exchanger.

These and other objects are effected by my invention, as will be apparent from the following description and claims taken in connection with the accompanying drawings forming a part of this application in which:

Figure 1 is a longitudinal side view of a two-chamber heat exchange device constructed in accordance with the method of my invention, a portion being cut away to show the interior arrangement;

Figure 2 is an end view of the device shown in Figure 1, with a portion cut away to show the interior arrangement of the parts;

Figure 3 is an enlarged end view of one of the rectangular coils used in forming the mat or internal extended surface portion, and is an end view of the coil shown in Figure 4;

Figure 8:
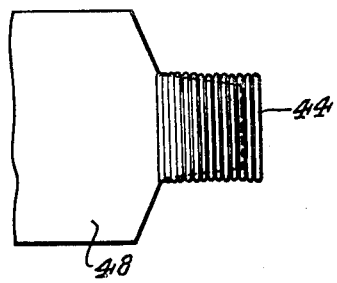
Figure 9:
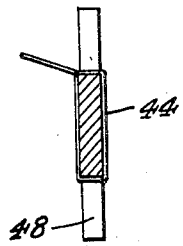
Figure 12:
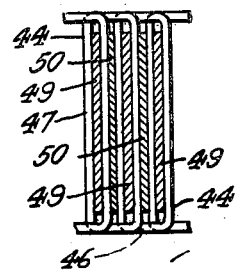
Figure 10:
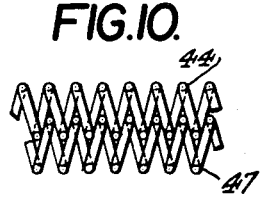
Figure 11:
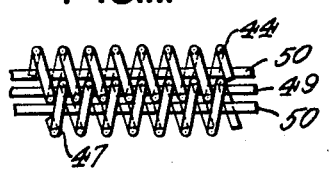
Figure 13:
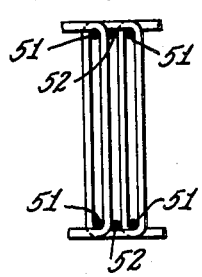
Figure 14:
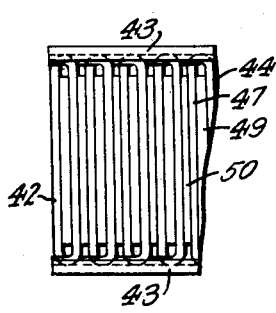
Figures 15, 16:
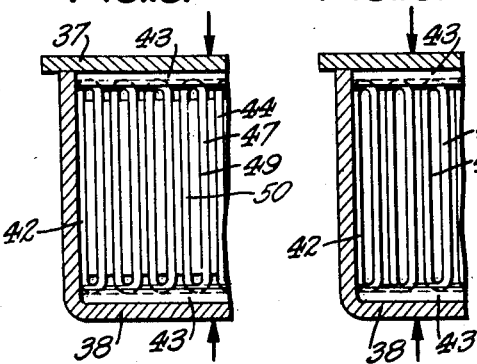
Figure 17:
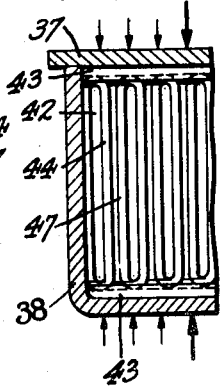
Figure 18:
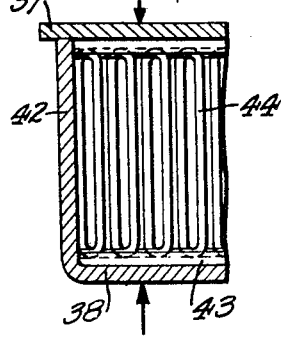
Figure 19:
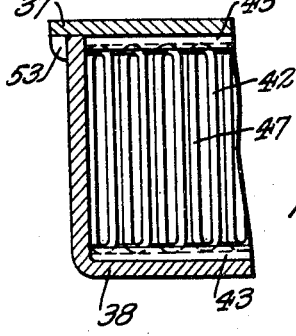

Figure 4 is an enlarged side elevation of a fragment of the rectangular coil of Figure 3, which forms extended heat conducting surfaces for the fluid chamber walls. The particular coil illustrated is a right-handed coil, and the loops are slightly pulled apart for the purpose of clearer illustration. Left-handed coils, otherwise identical in construction, are also provided;

Figure 5 is an enlarged end view of enmeshed coils showing the coils nested or enmeshed in accordance with my invention. A left-handed coil is shown intermediate and enmeshed with two right-handed coils;

Figure 6 is an enlarged view of a portion of the mat composed of a plurality of enmeshed coils bonded together in spaced relationship;

Figure 7 is a plan view of the mat portion shown in Figure 6, partly cut away to show the mat in cross-section;

Figures 8 and 9 are side elevation and end views, respectively, showing the winding of a coil on a mandrel;

Figure 10 is an enlarged fragmentary view showing a right-handed coil and a left-handed coil arranged in enmeshed position with the loops of one being partially inserted between the loops of the other;

Figure 11 is a view similar to that of Figure 10, with the addition of the locking and spacing bars or pins inserted longitudinally through the loops in accordance with my invention to assemble the coils in fixed spaced relation;

Figure 12 is a transverse section of the enmeshed and locked coils of Figure 11, the locking and spacing members being shown as flat strips of rectangular cross-section which would require subsequent removal to permit the passage of fluid transversely through the coils;

Figure 13 is a view similar to that of Figure 12, showing a modification of the locking and spacing members. Wire pins or rods are substituted for the flat strips of Figure 12, and, since they have a diameter equal to the thickness of the flat strips, Figure 11 will serve to illustrate also the arrangement in plan;

Figure 14 is an enlarged fragmentary view showing a mat of enmeshed coils viewed in an axial direction with the locking bars and spacing bars of Figure 12 in place, and with a sheet or layer of bonding material added to the top and bottom of the mat of assembled coils;

Figure 15 is an enlarged fragmentary view showing the improved mat positioned in the fluid chamber of a heat exchange device, and illustrates, by large arrows, the application of external pressure to the opposite walls of the fluid chamber to press the mat therebetween, and locking and spacing bars being then in the mat;

Figure 16 is a view similar to that of Figure 15, but with the locking and spacing bars removed;

Figure 17 is a view similar to that of Figure 16, showing in addition the treatment of the bonding material by heat or otherwise to bond the assembled coils together and to the opposite walls of the chamber, the heat or other treatment being illustrated diagrammatically by the small arrows, the large arrows representing the pressure against the chamber walls;

Figure 18 is a view similar to that of Figure 17, showing the parts after the termination of the heating or other treatment, the coils and other parts of the device then being cooled while the pressure is still being applied; and Figure 19 is a view similar to that of Figure 18, showing the connection made between the upper and lower walls of the chamber after the cooling and application of pressure has ceased, and the device is ready for final assembly by joining all walls together to enclose the chamber.

The method of my invention applies to both single and multiple-chamber heat exchange devices. In Figures 1 and 2 a two-chamber heating device is shown as an example of a heat exchanger constructed in accordance with my invention. The device is concerned particularly with the exchange of heat between the fluid in a chamber and a metal wall of the chamber. The fluid, of course, may be either liquid or gas. The wall of the chamber through which heat is to be transferred is considered to be the primary heat exchange portion of the device, and the surface of the wall is often referred to as the primary surface. The projections from the wall out into the chamber, variously called fins, pins, rods, and the like, are referred to as the secondary heat exchange portions of the device, and the surfaces thereof are referred to as the secondary surfaces.

Referring to Figures 1 and 2, there is shown a heat exchange device having an upper chamber 31 and a lower chamber 32. The upper chamber 31 has conduits or pipes 33 and 34 opening into the ends thereof and in communication with the interior of the chamber. Similarly, chamber 32 has the conduits 35 and 36 in communication therewith. As shown in the figures, each chamber is enclosed by opposite metal walls, the upper chamber 31 having opposite metal walls 37 and 38 and lower chamber 32 having opposite metal walls 38 and 39, the wall 38 forming a common heat exchange wall between the two chambers. In the construction shown, the bottom walls and two side walls of each chamber are formed from a single metal sheet turned up at the ends. When nested together, as shown in Figure 2, the bottom wall of a chamber forms the upper wall of the below adjacent chamber. The chamber 31 has end walls 40 on opposite ends thereof and the chamber 32 has end walls 41 on opposite ends thereof, the end walls 40 and 41 having flanged portions to provide strength to the assembly. The long flat walls 37, 38, and 39 being relatively thin and extending over a considerable area, tend to bulge or warp under internal pressure unless fortified by internal support. The fluid passing through the chambers may be under considerable pressure and the broad thin walls 37, 38, and 39 will buckle or sag without a proper internal construction, provided as shown.

Mounted within the fluid chambers 31 and 32 are mats, denoted generally by the reference character 42, one mat being provided for each fluid chamber of the complete device. The mat 42 is bonded to the opposite metal walls of the chambers by bonding material 43. The bonding material 43 may be a soft solder of lead and tin, a silver solder, a brazing material for aluminum or for steel, or any other material adapted to provide a good thermal connection and bond between the mat 42 and the walls of the chamber. The bonding material 43 also may be a foil added to the parts during assembly thereof and heated or otherwise treated in place, or it may be a portion of the wall itself which may be fused to bind the mat 42 in proper thermal and mechanical connection to the wall proper. For the purpose of clarity in illustration, the bonding material is shown as a flat layer 43. However, it is to be understood that the bonding material 43, as solder or similar substance, flows around the end portions of the mat 42, which thereby become embedded in the bonding material. The bonding material between the mat 42 and the wall may be very thin so that the mat and wall are substantially adjacent to each other and thermally and mechanically connected.

The mat 42 is composed of a plurality of coils disposed adjacent and parallel to each other. Adjacent coils are preferably enmeshed or nested by partially inserting the loops of one inside the loops of another. The loops are preferably of rectangular shape, that is, as coils of rectangular cross-section shape. The rectangular coils are preferably in the form of a long thin rectangle with long, broad sides and short narrow ends. To better illustrate the structure and arrangement of parts, the views of Figures 3, 4, 5, 6, and 7 are enlarged. Figure 3 is an end view and Figure 4 is a side or elevation view of a part of one of my coils. This coil is formed with a right-hand turn. The loops of the coil in Figure 4 are somewhat pulled apart to better show the individual loops. A single loop, as shown in Figure 3, may be considered as comprising two long pins along the long or broad side of the rectangle and as having short bent-over portions 45 and 46 at the ends of the rectangle, the bent over portions 45 and 46 being integral with the long pins forming the long or broad side of the rectangle.

In addition to a plurality of right-handed coils 44 there is also provided an equal number of left-handed coils, the latter being denoted by the reference character 47. Coils of right-hand turn and coils of left-hand turn are disposed alternately and with their broad sides adjacent each other. The several coils are then moved inwardly of each other to enmesh oppositely wound coils together. By this enmeshment, the loops of one coil are inserted between the loops, respectively, of an adjacent coil. In this way, each coil is partially disposed within adjacent coils. The individual loops or long broad side portions thereof are spaced apart by the thickness of the wire forming the adjacent coils. In this manner the loops are uniformly spaced from each other longitudinally of the coils, the spacing being determined by the diameter of the wire used in making the coils.

In Figure 5 three coils only are shown for simplicity of illustration. A right-handed coil 44 is enmeshed with a left-handed coil 47. On the other side of the coil 47 another right-hand coil 44 is also enmeshed with the coil 47. It is therefore seen that two coils 44 are partially extended within the coil 47. It is to be noted that the long broad sides of the enmeshed coils are equally spaced from each other. The long broad sides of the two coils 44 enmeshed within the coil 47 are spaced from each other. The long broad sides of the coils 44 within the coil 47 are equally spaced from the long broad sides of the intermediate coil 47. As a plurality of alternately wound coils 44 and 47 are progressively enmeshed and spaced equally from each other there is thus formed an assembly of enmeshed coils having these broad sides or pins equally spaced from each other laterally across the assembled mat.

In Figure 6 there is shown a portion of a mat composed of a plurality of coils 44 and 47 having a bonding material 43 applied to the outer surfaces thereof, that is, upon the short narrow sides 45 and 46 of the coils. This bonding material 43 may be of foil, solder, or other suitable bonding substance adapted to form a thermal and mechanical bond. Upon heating or other suitable treatment, the bonding material 43 flows around the end portions 45 and 46 and bonds together the coils in assembled and spaced relationship. If desired, the bonding material 43 may be heated or otherwise treated to bond the coils together to make the complete mat prior to assembly within and attachment to the walls of the heat exchanger fluid chamber. However, it is believed preferable to heat or otherwise treat the bonding material 43 after the mat 42 is in the fluid chamber, so as to bond the coils together and to the walls of the fluid chamber in one operation.

Figure 7, being a plan view in partial section looking down in the direction of the arrows 7—7 of Figure 6 illustrates the spaced relationship of the coils. It is seen from these several views that the coils may be considered as forming a plurality of pins or rods extending at right angles to the wall of the fluid chamber. These longitudinal pins or rods may be considered as having bent over portions, such as portions 45 and 46 in Figure 3, which are disposed parallel to, and adjacent, the wall of the fluid chamber. This bent over portion provides for improved thermal connection and heat exchange between the pins or rods and the chamber wall. Moreover, the pins or rods are interconnected by the short bent over portions so that there is a quick and ready exchange of heat therebetween and added uniformity of heat exchange throughout the chamber. The bonding material 43 embeds the short end portions of the loop and thermally and mechanically joins them together to keep the long broad sides of the loops or pins uniformly spaced apart, in thermal and mechanical connection with the wall of the chamber through which heat is to be exchanged.

By reason of the relative fineness of the wire forming the coils and the small subdivided space formed between them by the described spacing, there is provided a rapid and efficient heat exchange between the fluid in the chamber and the broad or long side portions of the coils extending in the fluid path. The great number of broad side portions or pins in a given area provides a large amount of secondary heat exchange surface for exchange of heat between the coils and the fluid. As will be readily recognized by one knowing the needs and requirements of an efficient heat exchanger, the present heat exchanger provides means for quick, ready, and uniform exchange of heat between a fluid chamber wall and the fluid within the chamber.

The construction of the mat having the rectangular coils enmeshed together provides other advantages all of which will be apparent from inspection of the construction thereof. For example, the straight disposition of the long broad sides of the coils between opposite walls of the fluid chamber provides added strength and rigidity to the fluid chamber. The straight-sided coils have considerable strength and rigidity upon compression and can stand considerable stress upon application of external pressure to the opposite walls of the fluid chamber. Furthermore, the coils which are mechanically as well as thermally bonded to the opposite walls of the chamber, tie or connect the opposite walls together at a plurality of uniformly spaced points over the entire surfaces of the opposite walls. Upon introduction of fluid under pressure within the chamber tending to expand and buckle the opposite wall thereof, the rectangular coils hold the opposite walls together and prevent the chamber walls from buckling. The mat therefore not only adds to the heat exchange properties of the heat exchanger but also adds to its mechanical strength, durability and serviceability. Many other improved results are readily apparent from the showing and description of the device and the method for constructing the same embodying my invention.

In Figures 8 to 19, inclusive, there are shown the steps taken in making the improved heat exchange device, and particularly the making of the improved mat for a heat exchange device. In Figure 8 a coil 44 is formed by winding wire around a revolving mandrel 48. This wire may be made of copper, stainless steel, brass, iron, aluminum, or other material having good heat-conducting qualities, the desired physical strength, and the desired workability for forming coils in the desired shape. As shown in Figure 9, the mandrel about which the wire is wound to form a coil is of the general shape cross-sectionwise of the coil to be formed, in this case of long rectangular shape. As seen in Figure 8, the mandrel is formed with sloping surfaces to facilitate the ready removal of the coil from the mandrel as the winding of the coil progresses.

After a suitable number of right-handed coils are formed, a similar number of left-handed coils are formed, the right-handed coils 44 and the left-handed coils 47 being of equal size and similar shape. The coils are alternately stacked so that oppositely wound coils are adjacent each other. It is found preferable to nest the coils together by laying one coil flat on its broad side, and then placing a coil of opposite turn over it with the broad sides of the coils adjacent to each other.

Adjacent coils 44 and 47 are then pressed together as shown in Figure 10 to insert the loops of one between the loops of the other, respectively. The loops of each are thereby spaced apart by the loops of the other. As seen in Figure 10, the loops are enmeshed with each other so that one coil is partially inserted within the other coil. Although Figure 10 shows only two coils so enmeshed, it is to be understood that successive alternately wound coils are progressively added to the assembly and progressively enmeshed with the coils to form the complete mat.

In order to hold or maintain the assembled and enmeshed coils as a unitary mat structure, especially during handling and while mounting the same in the fluid chamber of the heat exchange device, locking members are slid longitudinally through the coils to lock adjacent enmeshed coils in position. The locking members restrain movement of the coils laterally away from each other, that is, disengagement. The locking members may be in the form of long flat strips 49 of rectangular cross-section, as shown in Figure 12, or they may be in the form of wire rods 51, as shown in Figure 13, one or more of the latter being employed as desired, and being positioned within the coils in any manner suitable to provide the required spacing of the coils. To space the progressively added coils from the coils already enmeshed in a particular coil, spacing bars 50 or spacing rods 52 are also slid longitudinally through the center of each coil. The spacing bars 50 are all of equal thickness and are also equal in thickness to the locking bar 49. Locking wire rods 51 and spacing wire rods 52 also are of equal thickness or diameter. Figures 12 and 13 being transverse views of the enmeshed coils positioned vertically, better illustrate and demonstrate the purpose and utility of the locking and spacing bars 49 and 50, respectively, and the locking and spacing wires 51 and 52, respectively. As seen, bars 49 hold the enmeshed coils 44 and 47 in locked position and yet spaced apart from each other by the thickness of the locking bar 49. Also, the spacing bars 50, of equal thickness, prevent the next adjacent coil extended into a coil from moving too far inwardly. As the bars 49 and 50 are of equal thickness, the long broad sides of the enmeshed coils are positioned equidistantly from each other. This equal spacing provides for a uniform and regular arrangement of the interstices in the improved mat through which the fluid may freely flow and come in contact with all surfaces of the coils in the mat.

It is obvious from a study of Figure 12 that locking and spacing bars 49 and 50, respectively, require subsequent removal from the assembled mat or the assembled heat exchanger, since they block the transverse fluid paths through the interstices of the mat. Such removal is preferably done after the mat is assembled and properly positioned within the fluid chamber and after external pressure has been applied to hold the assembled parts in their desired positions. If the flat strips 49 and 50 are made of durable substance, such as steel, they may be physically withdrawn immediately prior to the heating or soldering step, hereinafter to be described. Alternatively, however, the flat strips 49 and 50 may be formed of a plastic substance which may readily be dissolved, melted, or otherwise transformed into a condition where it may subsequently be washed out or be otherwise removed in its transformed state from the assembled unit.

When locking and spacing members of the type shown in Figure 13 are employed, it is apparent that their subsequent removal is not required, since they do not materially obstruct the lateral flow of fluid through the coils. Wires 51 and 52, as shown in Figure 13, also may be formed of a substance which later can be dissolved or melted out of the mat.

As shown in Figure 14, there is next applied to the assembled mat of enmeshed coils a bonding material 43. This bonding material may be added or applied to the sides of the mat prior to or after assembly of the mat with the fluid chamber. In the illustration of Figure 14, the bonding material 43 is placed on the mat 42 as a foil or sheet of soldering substance.

The mat 42 is then placed between walls 37 and 38 of a fluid chamber as shown in Figure 15. The wall 37 is movable with respect to the remainder of the chamber so that the mat 42 may be placed down in the tray formed by the bottom wall 38. In speaking of the assembly of the device, the walls 37 and 38 are referred to as being movable toward and away from each other in assembling or disassembling the device. If the soldering material 43 has not previously been applied to the mat 42 it is now applied on the top and bottom portion between the mat of coils and the two opposite metal walls. Alternatively, the bonding material 43 may be integral with the walls 37 and 38, and not separately applied. In such case the bonding material 43 may nevertheless be considered as a layer of material at the junction of the walls 37 and 38. When the walls 37 and 38 are of suitable material they may be brazed or otherwise bonded directly to the mat 42. The material on the inner surface of the walls 37 and 38, although integral with the walls, may appropriately be considered as bonding material for thermally and mechanically bonding the opposite walls 37 and 38 to the coils and bonding the coils together at the walls.

At this point external pressure is applied to the walls 37 and 38 to press the walls toward each other and against the mat 42 to provide firm engagement between the mat 42 and each wall. This external pressure may be provided by a ram, press, or other suitable means applied uniformly over the outside area of the walls 37 and 38, respectively. This uniform pressure is indicated diagrammatically by the large arrows opposing the walls 37 and 38 in Figures 15, 16, 17, and 18. The external pressure is sufficient to hold the walls 37 and 38 in parallel relationship and to press them in firm engagement with the mat 42 therebetween.

While the external pressure is being maintained, as in Figure 16, all of the locking bars 49 and spacing bars 50 may be withdrawn by sliding them longitudinally out of the coils through the open end of the chamber. The walls of the chamber, held in firm engagement with the mat 42 by the application of external pressure, maintain the coils in their straight relationship even though the spacing and locking members have been removed. Also, while the opposite walls of the chamber are maintained under external pressure, so as to hold the coils in position and the opposite walls in fixed relationship, the bonding material 43 is heated or otherwise treated to fuse it and to cause the bonding material to bond the coils together at the walls 37 and 38 and to bond the coils to the walls 37 and 38. The several arrows in Figure 17, as distinguished from the large pressure-indicating arrows, are for the illustration of the application of heat or other treatment to the assembled parts.

The external pressure on the walls 37 and 38 is preferably maintained until after the bonding material has cooled and a proper bond, thermal and mechanical, is established between the mat 42 and the said opposite walls. After solidification and cooling, or completion of other bonding, the external pressure on the walls 37 and 38 is removed. As the walls 37 and 38 are now firmly held together by the long flat sides of the coils extending between the walls, the walls will not tend to buckle or warp upon the application of comparatively high internal pressure. The top and bottom walls may next be connected and hermetically sealed by brazing or welding, as at the fillets 53 shown in Figure 19. This joining of the opposite walls at 53 may be done while the assembly is under the external pressure shown in Figure 18, or it may be done after the external pressure is removed.

The enclosure of the fluid chamber is next completed by adding the opposite end walls 40 as shown at one end, for example, in Figures 1 and 2. The enclosed and assembled fluid chamber is then substantially similar to the upper chamber 31 in the device as shown in Figures 1 and 2. The process is substantially the same for making multiple unit devices in which one chamber is progressively added on top of other chambers as in Figures 1 and 2. When more than one chamber is being constructed the mat 42 may be placed in the plurality of trays formed by the bottom wall of the chambers, the chambers stacked together, the pressure applied to all of them simultaneously, and the heating or other treatment applied to all of them at once.

This method of forming the improved heat exchanger device and particularly the mat for the fluid chamber thereof is simple and economical in manufacture, and provides a simple and effective way of making devices embodying the improved construction.

Although I have described the method of my invention as applied to a preferred form of heat exchanger device and I have described the latter with a certain degree of particularity, it is understood that the present disclosure of the preferred form has been made only by way of example and that numerous changes in the details of the method and the combination and arrangement of process steps may be resorted to without departing from the spirit and the scope of the invention as hereinafter claimed.

I claim:

1. The process of making a heat exchanger having a fluid chamber, said fluid chamber having opposite walls, at least one of said opposite walls being a heat transfer wall, comprising the steps of: winding metal wire into a plurality of right-handed coils formed with two opposite straight sides and a plurality of left-handed coils with similar two opposite straight sides; stacking said coils together with right-handed and left-handed coils placed alternately and with the straight sides of said coils disposed in parallel relationship; enmeshing adjacent coils together to insert the loops of each coil between the loops of an adjacent coil, respectively, and to space said loops from each other; inserting a locking bar between the straight sides of enmeshed adjacent coils to lock said coils together; inserting a spacing bar between the straight sides of coils extended into an intermediate coil to space said straight sides from each other; applying a metallic soldering material to the outer opposite sides of the enmeshed coils; placing the enmeshed coils between said opposite walls of the fluid chamber; applying pressure to said opposite walls to press them toward each other and against the enmeshed coils; removing said locking bars and spacing bars from said coils; treating said bonding material while applying said pressure to thermally and mechanically bond said enmeshed coils to said walls and said coils together at said walls; removing said pressure from said walls; and connecting said walls to enclose said chamber.

2. The process of making a heat exchanger having a fluid chamber, said fluid chamber having oppositely disposed heat transfer walls, comprising the steps of: winding heat conducting wire into a plurality of coils, half of said coils having a left-hand turn and half of said coils having a right-hand turn, said coils being formed to have oppositely disposed broad flat sides and oppositely disposed narrow flat sides; enmeshing said coils together along their broad flat sides to place oppositely turned coils adjacent each other and partially within each other; inserting locking bars between enmeshed coils to lock the same in position; inserting spacing bars in said coils partially placed therein to space them apart; placing the enmeshed coils between said walls; pressing said walls against said enmeshed coils; removing said locking bars and said spacing bars from said coils; soldering, while pressing said walls, the narrow flat sides of the enmeshed coils to each other and to said walls to mechanically and thermally connect the coils together and to said walls; discontinuing the pressing of said walls; and connecting said walls to enclose said chamber.

3. The process of making a heat exchanger having oppositely disposed fluid chamber walls comprising the steps of: forming a plurality of right-handed coils and a plurality of left-handed coils, placing oppositely turned coils adjacent to each other; enmeshing said adjacent coils together; placing bars through adjacent enmeshed coils to lock them in enmeshed position; placing bars in said coils between coils enmeshed therein; placing the enmeshed coils between said walls; removing said bars from said coils; and thermally and mechanically bonding said coils to said walls.

4. The process of making a heat exchanger having a fluid chamber comprising the steps of: forming a plurality of right-handed coils and a plurality of left-handed coils; enmeshing right-handed coils with left-handed coils to form a mat insertable within said fluid chamber, placing bars through said enmeshed coils to lock the same in predetermined fixed position; inserting said mat within said fluid chamber; removing said bars from said coils; and thermally and mechanically bonding said mat to the wall of said fluid chamber.

PAUL R. TRUMPLER.

REFERENCES CITED

The following references are of record in the file of this patent:

UNITED STATES PATENTS

| Number | Name | Date |
|---|---|---|
| 83,019 | Baggott | Oct. 13, 1868 |
| 145,907 | Schpakowsky | Dec. 23, 1873 |
| 299,972 | Fontneau | June 10, 1884 |
| 790,979 | Peirce | May 30, 1905 |
| 1,559,180 | Prat | Oct. 27, 1925 |
| 2,154,217 | Savage | Apr. 11, 1939 |
| 2,196,186 | Berg | Apr. 9, 1940 |
| 2,247,199 | Kritzer | June 24, 1941 |